United States Patent [19]
Wardenaar et al.

[11] 4,235,395
[45] Nov. 25, 1980

[54] MAGNETIC TAPE CASSETTE WITH PIVOTING COVER

[75] Inventors: Hendrik C. Wardenaar, Eindhoven, Netherlands; Franz Werner, Vienna, Austria; Petrus J. J. Aarts, Eindhoven, Netherlands; Franz Beitler, Vienna, Austria

[73] Assignee: U.S. Philips Corporation, New York, N.Y.

[21] Appl. No.: 974,296

[22] Filed: Dec. 29, 1978

[30] Foreign Application Priority Data

May 9, 1978 [NL] Netherlands ............... 7804936

[51] Int. Cl.³ .................. G03B 1/04; G11B 15/32
[52] U.S. Cl. .................... 242/199; 360/132
[58] Field of Search ............ 242/197–200, 242/55.19 A; 360/92, 96, 132; 352/72, 78 A; 206/389

[56] References Cited
U.S. PATENT DOCUMENTS

| | | | |
|---|---|---|---|
| 2,941,741 | 6/1960 | Bilsback | 242/199 |
| 3,627,225 | 12/1971 | Badum et al. | 242/182 |
| 3,980,255 | 9/1976 | Serizawa | 242/198 |
| 3,987,489 | 10/1976 | Schoetfle et al. | 360/132 |
| 4,021,006 | 5/1977 | Morimoto et al. | 242/199 |

FOREIGN PATENT DOCUMENTS

693982  1/1970  Fed. Rep. of Germany.

*Primary Examiner*—Leonard D. Christian
*Attorney, Agent, or Firm*—David R. Treacy

[57] ABSTRACT

A magnetic tape cassette of the "flip-over" type having side-by-side reels in a housing between two parallel main walls, an exposed run of tape along a front of the cassette housing, and a pivoting cover for the exposed run of tape. A single cassette cover covers the entire front of the housing, and has a pivoting arm at each side which is journalled to the cassette housing sidewalls such that the cover can be opened from its closed position in either direction to two different open positions, by pivoting toward the one or toward the other main wall of the housing. A movable slide may also cover openings which provide access behind the stretch of tape.

28 Claims, 30 Drawing Figures

MAGNETIC TAPE CASSETTE WITH PIVOTING COVER

BACKGROUND OF THE INVENTION

1. Field of the Invention

The invention relates to a magnetic tape cassette which is adapted to cooperate, in a first position and in a reversed second position, with parts of a cassette recording and/or playback apparatus (hereinafter referred to as a cassette apparatus); and more particularly to a cassette having first and second adjacently disposed reel hubs, which are rotatable about parallel spaced first and second axes of rotation in a cassette housing; a length of magnetic tape having a first end connected to the first reel hub and having a second end connected to the second reel hub, so as to enable it to be wound from the first reel hub to a reel on the second reel hub and back from the second reel hub to a reel on a first reel hub, and having a stretched tape portion along a front opening of the cassette housing for cooperation with parts of a cassette apparatus; and cover means connected to the cassette housing and pivotable relative thereto about a pivoting axis which is parallel to the main walls between a closed position and an open position. In the closed position, the cover extends along the front of the cassette housing, to at least partly cover the stretched portion of the magnetic tape and thus protect the magnetic tape against inadvertent damaging when the magnetic tape cassette is not placed on a cassette apparatus. The open position, when the magnetic tape cassette is placed on a cassette apparatus, allows parts of the cassette apparatus to cooperate with the stretched portion of the magnetic tape.

Magnetic tape cassettes in a variety of versions have gained a high degree of popularity in various fields of application. This may be attributed to the high vulnerability of the magnetic tape medium when not accommodated in a cassette. The magnetic tapes commonly used in magnetic tape equipment for the consumer market and also for many semiprofessional and professional uses have a thickness dimension which is very small in comparison with the width dimension. The thickness dimensions generally range between 15 and 40 um, while the width for the more customary magnetic tapes varies roughly between 12 and 25 mm. The magnetic tapes consist of a plastic foil which on one side is provided with a finely dispersed magnetizable material, and has an extremely high degree of flexibility. The magnetic tape cassette affords protection against damaging of the delicate and vulnerable magnetic tape, so that the ease of handling the magnetic tape medium is substantially improved.

For many simple applications it suffices if the front of the cassette is at least partly closed and is provided with openings for the passage into the cassette of parts of a cassette apparatus, such as a recording/playback head, an erase head and a pressure roller. Such a cassette is for example the so-called Compact Cassette, also referred to as the Philips cassette, which is generally used for audio purposes. With this cassette the magnetic tape need never be removed from the housing, so that the front may be partly closed and thus affords adequate protection of the magnetic tape against inadvertent touching. While dust can reach the magnetic tape through the openings, this seldom presents a problem in that tape application.

Still other known cassettes are intended for use with a cassette apparatus which includes a device for partly withdrawing the magnetic tape from the cassette housing and bringing the portion of the magnetic tape thus removed from the cassette housing into contact with the magnetic heads. For audio applications this enables a better guidance of the magnetic tape during its transport from the one reel to the other along the magnetic heads to be obtained, so that higher quality standards in respect of signal recording and reproduction can be achieved than with the previously mentioned Compact Cassette, in which the lace-up is determined by components of the cassette housing.

In known magnetic video tape equipment for home-entertainment use, which to date are always equipped with rotary magnetic heads which write obliquely oriented closely spaced tracks on the magnetic tape, the magnetic tape should also be withdrawn from the cassette housing. The front of the cassette housing must then be free of wall portions which could interfere with the withdrawal of the magnetic tape from the cassette housing. As a result of the absence of wall portions at the front the likelihood of the magnetic tape being touched inadvertently increases. This likelihood is further increased because the cassette apparatus customarily includes a device for withdrawing the magnetic tape from the cassette housing. Such a device enters the cassette housing through the main walls behind the magnetic tape and should engage the back side of the magnetic tape during withdrawal. Therefore, cut-outs which extend to the front are necessary in the main walls of the cassette. These cut-outs expose the edges of the magnetic tape, which exposure greatly increases the likelihood of the magnetic tape being damaged.

Another aspect of cassette design is that, when magnetic tape cassettes are used on equipment which enables higher quality audio recording and reproduction or which enables video signals to be recorded and reproduced, dust should be prevented from reaching the magnetic tape as far as possible, because dust may affect the high quality of recording and reproduction.

Therefore many magnetic tape cassettes are provided with movable cover means in order to protect the stretched portion of the magnetic tape which extends along the front of the magnetic tape cassette when the magnetic tape cassette is not located on a cassette apparatus.

2. Description of the Prior Art

Magnetic tape cassettes which are suitable for use on a cassette apparatus in a first position only and which are consequently not suitable for cooperating with the apparatus in a reversed or "flipped over" second position, so-called non-reversible cassettes, present fewer problems in respect of the protection of the magnetic tape, because only one of the two main walls need be provided with cut-outs for withdrawal of the magnetic tape from the cassette. Such a cassette is for example known from U.S. Pat. No. 3,900,172. A cassette cover closes the front of the cassette housing if the cassette is removed from a cassette apparatus. On its side which faces the rear of the cassette the cassette cover has an additional ridge which covers the back side of the magnetic tape when the cassette cover is closed. Although one of the main walls of the cassette has a comparatively large opening this still provides satisfactory protection of the magnetic tape. However, dust can still rather easily reach the magnetic tape, and the tape can readily be damaged by the ridge if the stretched portion of the magnetic tape in the cassette is not sufficiently taut.

In the case of reversible magnetic tape cassettes this solution cannot be adopted. If the housing of a reversible magnetic tape cassette has cut-outs in the main walls for withdrawal of the magnetic tape from the magnetic-tape cassette, the cut-outs should be formed in both main walls. From German Offenlegungsschrift No. 2,552,063, to which U.S. Pat. No. 4,021,006 corresponds, a reversible magnetic tape cassette of this type is known, having two cassette covers which partly extend along the front of the cassette housing: a first cassette cover on the side near the first main wall of the cassette housing, and a second cassette cover on the side near the second main wall of the cassette housing. When the cassette covers are closed a part of the first cassette cover is situated in the plane of the first main wall and a part of the second cassette cover is situated in the plane of the second main wall. At the front of the magnetic tape cassette perpendicular to these parts, half-height front cover portions extend parallel to the rear of the cassette housing, and are thus perpendicular to the first-mentioned parts of the cassette covers. The first cassette cover is pivotable about a first pivoting axis disposed near the first main wall of the cassette housing and the second cassette cover is pivotable about a second pivoting axis disposed near the second main wall of the cassette housing. The two pivoting axes are parallel to each other and parallel to the main walls. The two cassette covers also have gear-segments which engage with each other. When the one cassette cover is pivoted the second cassette cover is thus pivoted simultaneously and to the same extent. Each cassette cover covers the front of the cassette housing over half its height.

When this known magnetic-tape cassette is placed on a cassette apparatus, a unit on the deck of the cassette apparatus partly opens the two cassette covers, after which the magnetic heads are brought into contact with the magnetic tape through the slot between the two cassette covers. The magnetic tape cassette has cut-outs in the main walls for bringing the magnetic tape into contact with two pressure rollers by means of two capstans on either side of the magnetic head, which capstans are situated behind the magnetic tape.

A disadvantage of this known cassette is that both in the first and in the second position of the magnetic tape cassette on a cassette apparatus the two cassette covers must be opened. One of the two cassette covers is then always pivoted into a position in which it moves toward and faces the cassette apparatus. In the cassette apparatus the magnetic tape cassette should therefore be supported in such a way that there is sufficient clearance between the main wall of the magnetic tape cassette which faces the cassette apparatus and the parts of the apparatus near that wall. Another drawback is that the opened cassette covers constitute an obstruction to the device which withdraws the magnetic tape from the cassette, unless the cassette covers are opened very far. This last alternative demands a still greater clearance. Otherwise both sides adjacent the cassette covers must have cut-outs formed which open towards the front, as in the known cassette, so that the magnetic tape is exposed at these locations. The spaced required above the cassette for the opened cassette cover is comparatively large, because the cassette cover portion which is disposed in the main wall also pivots upwards. This is a drawback because the overall height of a cassette apparatus should be minimized for obvious reasons.

Therefore, the known magnetic tape cassette is less suitable for application where the magnetic tape is to be withdrawn from the cassette housing. Moreover, unless openings are formed in the main walls of the cassette housing on both sides of the cassette covers for the passage of the tape withdrawal elements of a cassette apparatus, which means that there will be locations on both sides of the cassette covers where the magnetic tape can be touched and damaged, the two cassette covers should be pivoted into their open positions before the magnetic tape cassette is moved to an operating position over the withdrawal elements of the cassette apparatus. However, for thus swinging open the cassette covers before the magnetic tape consists is completely in its operating position, the known magnetic tape cassette is less suitable because of the actuation elements for the cassette covers which are then required. Further, the part of the cassette cover which faces the deck of the cassette apparatus and which is situated at the front of the cassette housing constitutes an obstruction for the withdrawal elements even if the cassette covers are swung open very far.

SUMMARY OF THE INVENTION

It is the object of the invention to provide a magnetic tape cassette which may be inverted or flipped over, and which provides good protection against dust or accidental touching when closed, but does not require excessive clearance between the cassette and the apparatus.

Covers

In accordance with the invention a single cassette cover substantially covers the entire front of the cassette housing; and on both sides the cassette cover is provided with pivoting arms which extend along the side walls of the cassette housing toward the rear of the cassette housing in the closed position, from its closed position the cassette cover being pivotable into either of two different open positions, one towards the first main wall of the cassette housing and the other towards the second main wall of the cassette housing.

In the cassette in accordance with the invention the entire front of the cassette housing is covered, so that if the main walls have cut-outs which extend to the front of the cassette housing, the tape is protected to some extent against inadvertent touching. As the cassette cover is movable in either of two pivoting directions, a magnetic tape cassette is obtained which on its side which faces a cassette apparatus has no obstacles which impair placing of the cassette on the cassette apparatus or the insertion of elements of the apparatus into the cassette. Above the magnetic tape cassette a certain clearance is required for the swung-open cassette cover. However, this clearance may be comparatively small and need not be greater than the height dimension of the magnetic tape cassette, but may even be smaller.

In most cassette equipment, the magnetic tape cassette is not placed directly onto the deck by hand, but is slid into a movable cassette holder, after which the cassette holder is moved towards the deck. The magnetic tape cassette in accordance with the invention is particularly suitable for such applications, because the movement of the magnetic tape cassette towards the deck allows provisions to be made on the deck for opening the cassette cover during the movement of the cassette holder. The cassette cover which is thus opened during the movement of the cassette holder does not impede insertion into the magnetic tape cassette of elements such as capstans, pressure rollers, magnetic tape retaining elements or elements for withdrawing the magnetic tape from the cassette.

Single Pivot

In a simple embodiment of the invention pivotal bearing means are disposed midway between the first and the second main wall and the cassette cover is pivotable in its first and its second pivoting directions about a single pivoting axis midway between the two main walls. This embodiment reduces the likelihood of the cassette cover touching the portion of the magnetic tape which is tensioned along the front of the magnetic tape cassette, during the pivotal movement of the cover, if the pivoting axis is situated somewhat to the rear of the magnetic tape cassette.

Double Pivot

In a preferred embodiment of the invention the pivotal bearing means comprise a first pivotal bearing means disposed nearer the side of the first main wall for pivoting the cassette cover in its first pivoting direction about a first pivoting axis which is also nearer the side of the first main wall, as well as a second pivotal bearing means disposed nearer the side of the second main wall for pivoting the cassette cover in its second pivoting direction about a second pivoting axis which is likewise nearer the side of the second main wall. This embodiment has the advantage that the distance between the stretched portion of the magnetic tape, which extends along the front of the magnetic tape cassette, and the inner side of the cassette cover, which faces the magnetic tape, can be reduced and that moreover the pivoting axes can be situated nearer the front of the cassette housing, without the risk of the magnetic tape being damaged. Thus smaller cassette dimensions are obtained. A further advantage of this embodiment is that the cassette cover can be pivoted into a position in which the front side of the cassette cover extends parallel to the main walls of the cassette housing without occupying much room in the apparatus, so that optimum accessibility of elements of the cassette apparatus to the magnetic tape is obtained.

Bearing constructions which enable a component to be pivoted into two different pivoting directions about two different parallel pivoting axes are known. Examples of these are the known hinge construction for swing doors, while there are also constructions comprising crosswise arranged straps.

A simple bearing construction which is suitable for a magnetic tape cassette is obtained with an embodiment of the invention in which the first pivotal bearing means include fist bearing journals as well as parts of the magnetic tape cassette which define first bearing recesses which receive the first bearing journals, and the second pivotal bearing means include second bearing journals as well as parts of the magnetic tape cassette which define second bearing recesses which receive the second bearing journals. These bearing recesses each have an opening at their circumference to allow movement of the first bearing journals out of the first bearing recesses during pivotal movement of the cassette cover about the second pivoting axis, and to allow movement of the second bearing journals out of the second bearing recesses during pivotal movement of the cassette cover about the first pivoting axis.

In this embodiment it is necessary to prevent the cassette cover in its closed or swung open positions, or during its pivotal movement, from becoming detached from the cassette housing by movement of the bearing journals out of the bearing recesses. In a further preferred embodiment parts of the magnetic tape cassette define arcuate first guide slots which each terminate in the respective openings in the circumference of the first bearing recesses, for guiding the first bearing journals with play during the pivotal movement of the cassette cover in its second pivoting direction; and parts of the magnetic tape cassette define arcuate second guide slots which each terminate in the respective openings in the circumference of the second bearing recesses, for guiding the second bearing journals with play during the pivotal movement of the cassette cover in its first pivoting direction. These parts of the magnetic tape cassette consist of parts of the side walls of the cassette housing if the bearing journals are disposed on the pivoting arms of the cassette cover, or consist of parts of the pivoting arms if the bearing journals are disposed on the side walls of the cassette housing.

The two guide slots intersect each other midway between the two main walls of the cassette housing. At the location of the intersection there is a possibility that a bearing journal does not move in the corresponding guide slot, so that the cassette cover could assume a wrong position. It is therefore advantageous to use an embodiment in which the bearing recesses have an at least partly circular cross-section with a diameter equal to the maximum transverse dimension of the associated bearing journal plus the play; the bearing journals have an elongate shape with a width dimension which is smaller than the length dimension; and the arcuate slots have a width dimension which is adapted to the width dimension of the associated bearing journal and is smaller than the diameter of the associated bearing recess. This embodiment prevents movements of the cassette cover other than in the first or the second pivoting direction in every position of the cassette cover, by cooperation of the bearing journals and parts of the cassette housing.

If the bearing journals are disposed on the pivoting arms and the guide slots are disposed in the side walls of the cassette housing, in another preferred embodiment providing a simple mounting of the cassette cover, each side wall of the cassette housing has mounting slots which extend in the direction of the bearing recesses and which intersect the guide slots at intersections, for mounting the bearing journals in the bearing recesses. The mounting slots each have an open entry side to allow unimpeded entry of the bearing journal into the mounting slot, and furthermore have a bottom with a profile which extends from a level at which there is play between the cassette cover and the cassette housing to a level at which the cassette cover is slightly bent by an interference fit between the bearing journals and the bottom of the mounting slots. Thus, when the cassette cover is being mounted, the cassette cover is slightly bent until the bearing journals engage with the bearing recesses, after which the bearing journals snap into the bearing recesses as a result of the resilient action of the cassette cover itself.

In order to obtain well-defined open positions of the cassette cover in a magnetic tape cassette of the types described above having first and second pivoting axes, according to another preferred embodiment of the invention in which the bearing journals are disposed on the pivoting arms of the cassette cover, the cassette housing is provided with stops which are adapted to cooperate with the second bearing journals so as to limit the pivotal movement of the cassette cover in its first pivoting direction, and with stops which are adapted to cooperate with the first bearing journals so as to limit the pivotal movement of the cassette cover in its second pivoting direction. In the embodiment in which guide slots for the bearing journals are formed in the side walls of the magnetic tape cassette, each of the guide slots at its end which is remote from the corresponding bearing recess may terminate at a portion of the side wall of the cassette housing, which portion functions as one of the stops which is adapted to cooperate with the bearing journals so as to limit the pivotal movements of the cassette cover.

Slide Plates

The invention is suitable both for audio and for video cassettes, both when they are not provided with cut-outs in the main walls which are open towards the front of the cassette housing and when such cut-outs are provided. However, it is a further object of the invention to provide a magnetic tape cassette having maximum fields of application. For such an objective it is necessary to form large cut-outs in the main walls of the cassette housing to permit the passage of elements of cassette apparatus of different types. In the case in which large cut-outs in the main walls of the cassette housing extend to the front, there is an increased risk of the magnetic tape being damaged and of dust and dirt penetrating into the interior of the cassette.

An embodiment of the invention, which satisfies this object, includes a first and a second slide plate respectively disposed near the first and second main walls, each slide plate being movable between a retracted position nearer the rear of the cassette housing and a closing position nearer the front of the cassette housing. Each slide plate leaves the respective openings in the corresponding main wall clear in its retracted position, and closes these openings at least partly and preferably completely in the closing position. Thus it is possible to provide magnetic tape cassettes which, once they have been removed from the cassette apparatus, are almost completely closed, except of course for the openings in the main walls for the passage of drive spindles for the magnetic tape reels; but which, once they have been placed on a cassette apparatus, first of all have a fully open front, and secondly also provide satisfactory access behind (to the back side of) the magnetic tape to allow passage of elements of a cassette apparatus through the cut-outs in the main walls.

An embodiment is preferred in which the two slide plates are part of a single slide member which is bodily movable between the retracted position and the closing position, which member also includes two side walls which extend along the side walls of the cassette housing and which interconnect the slide plates. The slide member may then be formed as a unitary component which is integrally manufactured from a plastic. These embodiments have the advantage that easy guidance and journalling of the slide plates on the cassette housing is assured.

Alternatively, according to another preferred embodiment, the slide member comprises two identical parts which are integrally manufactured from a plastic, which parts are provided with snap-connection means and are interconnected thereby through a snapped connection. As the two parts of the slide member are identical only one tool is required for manufacturing the slide member. The advantage of this embodiment mainly resides in the simplified mounting of the slide member. By using the snapped connection, the member can readily be mounted on the cassette housing after the magnetic tape reels and the cassette cover have been mounted in and on the cassette housing respectively. If the two pivoting arms of the cassette cover are located on the outside of the cassette housing, in a still further preferred embodiment the side walls of the slide member cover the pivoting arms in the closed position of the cassette cover. Thus, the pivoting arms are well protected when the magnetic tape cassette is removed from a cassette apparatus, so that the comparatively vulnerable bearing means of the cassette cover are protected against mechanical damaging. Moreover, a magnetic tape cassette is thus obtained with a clean-cut and smooth appearance, because the bearing constructions are covered by the side walls of the slide member.

Spring Restraints

For specific uses of the magnetic tape cassette in accordance with the invention it may be of importance that, once a cassette cover is open, it does not swing back to its closed position under the influence of gravity. An embodiment of the invention which is of interest in this respect includes resilient means which load the cassette cover relative to other parts of the magnetic tape cassette, the cassette cover being in a stable balanced position under the influence of the resilient load in its first and in its second open position for any orientation of the cassette relative to the direction of the force of gravity. The resilient means may for example act on the cassette cover and on the slide member and urge these components towards each other. Leaf spring constructions are also possible which cooperate with non-round bearing journals of the cassette cover. However, it is not always desirable to subject the cassette cover to a resilient load, because the bistable positions which the cassette cover can assume under the influence of the resilient menas require that the cassette apparatus include means for closing the cassette cover against the resilient load.

Comparatively simple means on the cassette apparatus are sufficient for moving the slide plates. Since the slide plates slide over the main walls of the cassette housing they are easily opened during the operation of inserting the magnetic tape cassette into a cassette holder. Preferably, resilient means are provided which act both on the cassette housing and on the slide plates so as to urge the slide plates towards their closing positions. With the aid of these resilient means the slide plates are always automatically moved towards their closed positions when the magnetic tape cassette is removed from the cassette apparatus. Moreover, the resilient means enable automatic ejection or at least partial ejection of a magnetic tape cassette from a cassette holder.

Accommodating the resilient means in the magnetic tape cassette may be a problem in view of the limited space which is available. When a slide member which is bodily movable is used, an embodiment is therefore of interest which makes optimum use of the space available in a magnetic tape cassette. In this embodiment the first and the second slide plates of the slide member are interconnected halfway between its two side walls and behind the magnetic tape by means of a connecting member, and the resilient means for loading the slide member towards the closed position comprise a pressure spring between the connecting member and the cassette housing. Thus, in the cassette housing a space exists halfway between its side walls and between the two circular reels, which can readily accommodate a helically wound pressure spring, so that the available and generally unused room can be utilized. A further advantage of this embodiment is that owing to the connection between the two slide plates at a location between the two side walls of the slide member the slide member is given a higher rigidity. If the slide member consists of a unitary component which is integrally manufactured from a plastic, it is advantageous to manufacture the slide member and the connecting member together as a single integrally manufactured component. As the connecting member is located behind the magnetic tape, mounting of such a slide member may be difficult. In an embodiment which overcomes this problem the unit comprising the slide member and the connecting member is made of two identical parts which are integrally manufactured from a plastic and provided with snap-connection means, the parts being interconnected by a snapped connection. After the magnetic tape reels have been mounted in the cassette housing and, as the case may be, also after mounting the cassette cover, the slide member can be fitted onto the cassette housing by moving the two parts of the slide member towards each other in a direction perpendicular to the main walls of the cassette housing and interconnecting them by means of a snapped connection. Subsequently, the pressure spring can be mounted between the cassette housing and the slide member.

Cover/Slide Movement

When a bodily movable slide member is used, in yet another preferred embodiment the slide member and the cassette cover are provided with cooperating parts for pivoting the cassette cover towards its closed position, no matter which of its two open positions the cassette cover occupies. The advantage of this embodiment is that the movement of the slide member to its closing position and the pivotal movement of the cassette over from an open position to its closed position can proceed in a single operation, when the slide member is moved towards its closing position. Furthermore, it is advantageous if the slide member and the cassette cover are provided with cooperating latching means which prevent the cassette cover from moving to the open position when the slide member is in the closing position. Thus, the cassette cover will always stay closed as long as the slide member is in its closing position.

For moving the slide member and subsequently opening the cassette cover when the magnetic tape cassette is placed on the cassette apparatus, in yet another preferred embodiment the edge of each of the side walls of the slide member remote from the rear of the cassette housing is arranged to be clear of the cassette cover, at least at locations which are disposed near the main walls. This edge may then be used as a stop means for moving the slide member to its retracted position when the magnetic tape cassette is placed in a cassette holder of the cassette apparatus. For opening the cassette cover after the cassette has been inserted and for moving the slide member in the cassette holder, in a different preferred embodiment the corresponding edge of each of the side walls of the slide member which is remote from the rear of the cassette housing has a recess formed at a location midway between the main walls of the cassette housing. The cassette cover is then provided with lateral projections which engage the recesses when the cassette cover is closed. These projections may be used to open the cassette cover by engaging elements on a cassette apparatus during movement of the cassette holder to an operating position.

In a magnetic tape cassette in accordance with the invention each of the slide plates will have a length dimension which is roughly equal to the distance between the side walls of the cassette housing; and transverse thereto, a width dimension which is substantially smaller. This occurs because the width dimension must be limited so that when the slide plate is in its retracted position the plate does not interfere with the drive means for the magnetic tape reels. The comparatively great length/width ratio of the slide plates is apt to cause the plates to jam if a slide plate or a slide-member does not perform a purely translational movement between its closing position and its retracted position, but rather twists slightly about an axis parallel to the axes of rotation of the magnetic-tape reels. Since jamming of the slide plates or the bodily movable slide member is obviously undesirable, in another preferred embodiment of the invention each of the side walls of the cassette housing, at the location of the side walls of the slide member when this member is in its retracted position, is provided with a curved profile with a radius of curvature which is substantially equal to the distance between the two side walls of the cassette housing. This profile enables the slide member to twist a little relative to the cassette housing, such that one side wall of the slide member is nearer the rear of the cassette housing than the other side wall of the slide member, without the slide member becoming jammed on the cassette housing.

In a different embodiment which is adapted to eliminate jamming effects, each of the side walls of the slide member comprises a portion which protrudes towards the rear of the cassette housing, so arranged that in the closing position of the slide member each side wall of the slide member extends beyond the location occupied by those sides of the slide plates of the slide member facing the rear of the cassette housing when the slide member is in its retracted position. That location, as previously stated, is dictated by the fact that the slide plates should not interfere with the drive means for the magnetic tape reels. However, the side walls of the slide member may extend further towards the rear of the cassette housing, so that a favorable ratio is obtained between the length of the slide member and its width at the location of the side walls. A further advantage is the improved appearance obtained by the use of the protruding portions, when the slide member is in the closed position; that is, the outward appearance viewed at a main wall is not spoiled by a stepwise change required because of the thickness of the slide member.

In many cases, especially if the slide member is loaded towards its closing position by resilient means, it is advantageous if the slide member and the housing are provided with cooperating stop means to prevent a slide member, once it has been mounted, from sliding off the cassette housing when the cassette cover has not yet been mounted or has been removed. This embodiment provides greater ease of handling the magnetic tape cassette during assembly. In addition, if the cassette includes resilient means for loading the slide member towards the closing position, a further advantage is obtained from this embodiment if, while the slide member is in the closing position, the stop means engage the slide member and transmit at least the greater part of the resilient load imposed by the resilient means to the cassette housing. When this embodiment is used the cassette cover, and thus the bearing means for the pivotal movements of the cassette cover, are not loaded by the resilient means.

BRIEF DESCRIPTION OF THE DRAWING

The invention will now be described in more detail with reference to the drawing, in which.

DESCRIPTION OF THE PREFERRED EMBODIMENTS

Single Pivot

Figure 1:
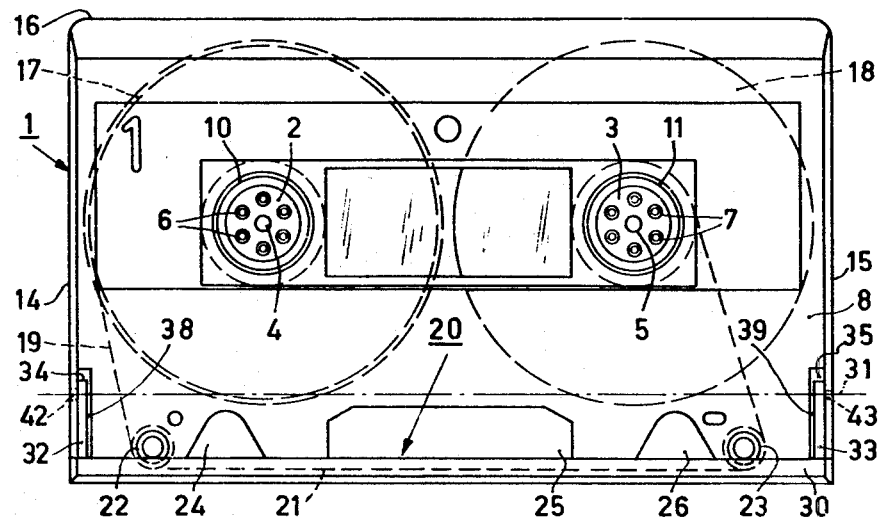
FIG. 1 is a view at a first main surface of a magnetic tape cassette having a cassette cover which is pivotable about a single axis.
Figure 2:
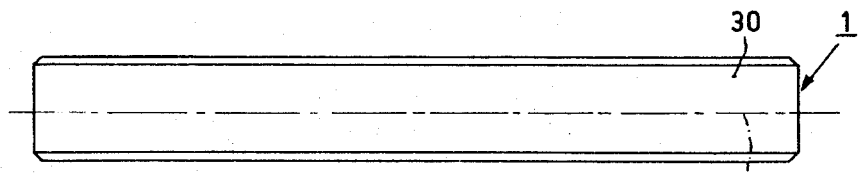
FIG. 2 is a side view at the cassette cover of the magnetic tape cassette in accordance with FIG. 1.
Figure 3:
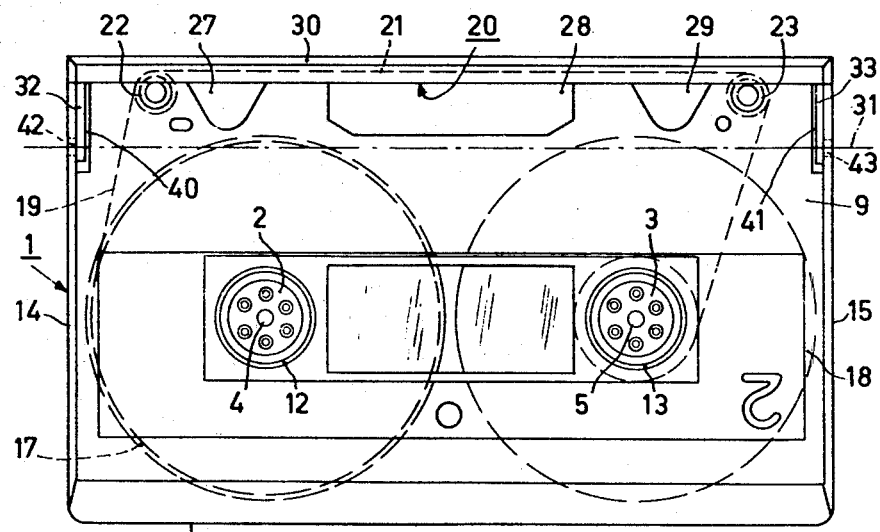
FIG. 3 is a view at a second main surface of the cassette of FIG. 1.
Figure 4:
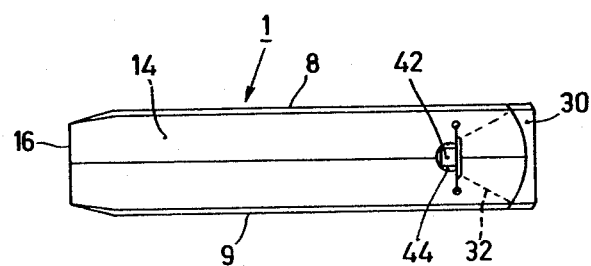
FIG. 4 is a side view of the magnetic tape cassette in accordance with the preceding Figures.

The magnetic tape cassette 1 in accordance with FIGS. 1 to 3 is adapted to cooperate with a cassette apparatus in a first position, as is shown in FIG. 1, and in a reversed second position, as shown in FIG. 3. As is customary with such so-called reversible cassettes, the two main walls are provided with designations "1" and "2" respectively, for the user. The magnetic tape cassette has a first and a second adjacently disposed reel hub 2 and 3 respectively, which are rotatable about parallel spaced axes of rotation, not shown. These hubs each have a central opening 4 and 5 respectively for engagement by a reel hub drive spindle which belongs to the cassette apparatus. Around the central openings 4 and 5 a number of openings 6 and 7 respectively are formed for a reel hub carrier pin of the cassette apparatus. The cassette 1 housing includes a first main wall 8 and, parallel thereto, a main wall 9. The main wall 8 has a first opening 10 coaxial with the first reel hub 2 to allow passage of a reel drive spindle, and a similar second opening 11 for the second reel hub 3. The second main wall 9 has corresponding first and second openings 12 and 13 respectively. The main walls 8 and 9 are interconnected by side walls 14 and 15 at their short sides, and by a rear wall 16. The reel hubs 2 and 3 have reel flanges 17 and 18 respectively. A length of magnetic tape 19 is connected to the reel hubs 2 and 3 at its two ends, so as to enable it to be wound back and forth between the first reel 2 and the second reel 3. Near a front opening 20, opposite the rear 16 of the cassette, a portion 21 of the tape 19 is stretched in a position where it can be engaged by parts of a cassette apparatus. To keep the stretched tape position 21 taut along the front of the cassette housing two guide rollers 22 and 23 are located between the two main walls 8 and 9 of the cassette housing. In the main wall 8 three cut-outs 24, 25 and 26 are formed, which are open towards and extend to the front opening 20 of the cassette housing, for the passage of components of a cassette apparatus behind the stretched tape portion 21 and to allow withdrawing the magnetic tape from the cassette housing. The main wall 9 has a corresponding cut-outs 27, 28 and 29 which also extend to the front opening 20.

Figure 5:
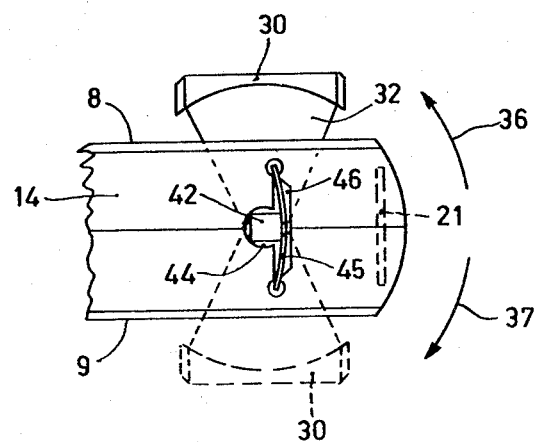
FIG. 5 is a detail of FIG. 4, showing the cassette cover swung open in a first pivoting direction, and a dashed line showing the cassette cover in a second open position in a second pivoting direction.

A cassette cover 30 is connected to the cassette housing and is pivotable relative thereto about a pivoting axis 31 parallel to the main walls, between a closed position, shown in FIGS. 1 to 4, and an open position which is obtained by a pivotal movement in a pivoting direction towards a main surface of the cassette housing. The cassette cover covers substantially the entire front opening 20 of the cassette housing. On both sides the cassette cover is provided with pivoting arms 32 and 33 having free ends 34 and 35 respectively, the arms extending along the respective side walls 14 and 15 of the cassette housing, toward the housing rear when in the closed position. The pivoting arms have free ends 34 and 35 respectively which face the rear 16 of the cassette housing in the closed position. The side walls 14 and 15 of the cassette housing and the pivoting arms 32 and 33 of the cassette cover 30 are provided with pivotal bearing means which cooperate with each other near the free ends 34 and 35 of the pivoting arms 32 and 33. As is shown in FIG. 5 the cassette cover 30 is pivotable from its closed position into two different opened positions. Solid lines in FIG. 5 represent a first open position of the cassette cover 30, which is reached by pivoting the cassette cover in a first pivoting direction indicated by an arrow 36 towards the first main wall 8 of the cassette housing. Dashed lines represent a second open position of the cassette cover reached by pivoting the cassette cover in a second pivoting direction in accordance with an arrow 37 towards the second main wall 9. The main wall 8 has slots 38 and 39 which are open towards the front 20 of the cassette housing for the passage of the pivoting arms 32 and 33 when the cassette cover 30 is pivoted in its first pivoting direction 36. The main wall 9 has corresponding slots 40 and 41 for pivoting in the second pivoting direction 37. The bearing means for the pivotal bearing of the cassette cover comprise two bearing journals 42 and 43 near the free ends 34 and 35 of the pivoting arms 32 and 33 and corresponding recesses in the side walls 14 and 15 of the cassette housing. An example of such a recess is the recess 44 in FIGS. 4 and 5.

The bearing journals 42 and 43 have a square cross-section and the recess 44 as well as the corresponding recess, not shown, in the side wall 15 of the cassette housing has a semicircular cross-section. In the side walls at the location of the bearing journals 42 and 43 leaf springs 45 provide a simple spring restraint for loading the bearing journals towards the rear 16 of the cassette housing. Because of the resilience of the leaf springs loading the square cross-section of the bearing journals of the cassette cover, the cassette cover will be held in a stable balanced position, both in its closed position and in its two open positions for any orientation of the magnetic tape cassette relative to the direction of the force or gravity.

Double Pivots

FIGS. 6 to 20 relate to a different embodiment of the invention. The magnetic tape cassette 47 is largely identical to the magnetic tape cassette 1 of FIGS. 1 to 5. The cassette includes reel hubs 48 and 49 with central openings 50 and 51 and additional openings 52 and 53 arranged around the central openings. The cassette housing comprises a first main wall 54 and a second main wall 55 with first openings 56 and 57 respectively, and with second openings 58 and 59 respectively, for the reel hubs 48 and 49. The main walls 54 and 55 are interconnected by side walls 60 and 61 and a rear wall 62. Opposite the rear wall there is located a front opening 63, see FIGS. 10 to 12. The cassette housing accommodates a magnetic tape 64 with a stretched tape portion 65 near the front 63.

A cassette cover 66 substantially covers the entire front 63 of the cassette housing. On both sides the cover 66 has pivoting arms 67 and 68 which extend along the sides walls 60 and 61 and which have free ends 69 and 70. In the closed position the arms 67 and 68 extend toward, and the free ends face, the rear 62 of the cassette housing. The side walls 61 and 62 and the pivoting arms 67 and 68 have cooperating pivotal bearing means near the free ends 69 and 70 of the pivoting arms. The cassette cover 66 is pivotable from its closed position, see FIGS. 6 to 8, into two different open positions; namely, a first open position, by pivoting in a first pivoting direction 71 (FIG. 10) towards the first main wall 54, and a second open position, by pivoting in a second pivoting direction 72 (FIG. 11) towards the second main wall 55 of the cassette housing.

Figure 10:
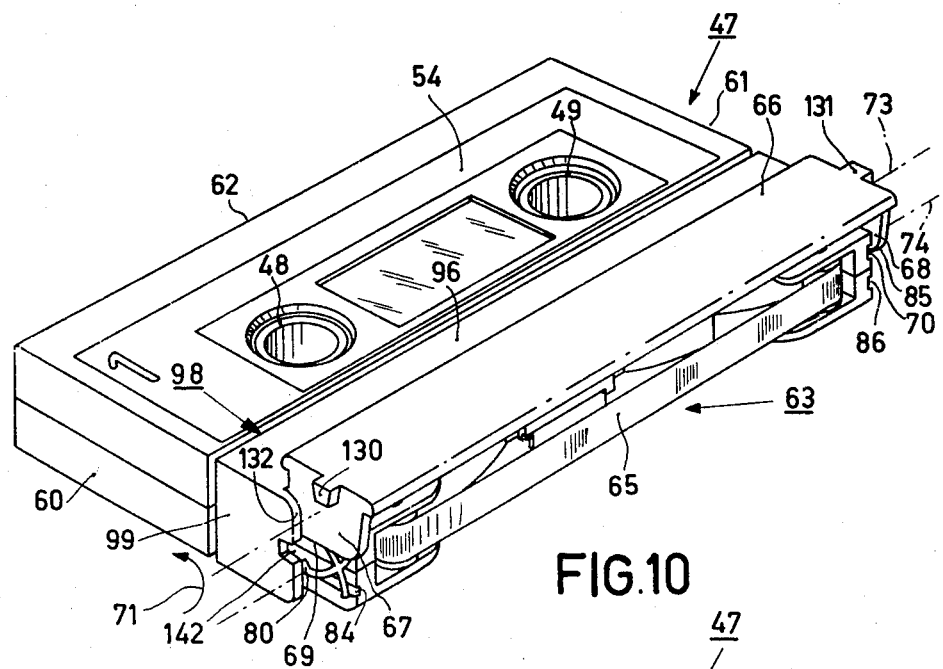
FIG. 10 is similar to FIG. 9, but with the slide member in its retracted position and the cassette cover opened in a first pivoting direction.
Figure 11:
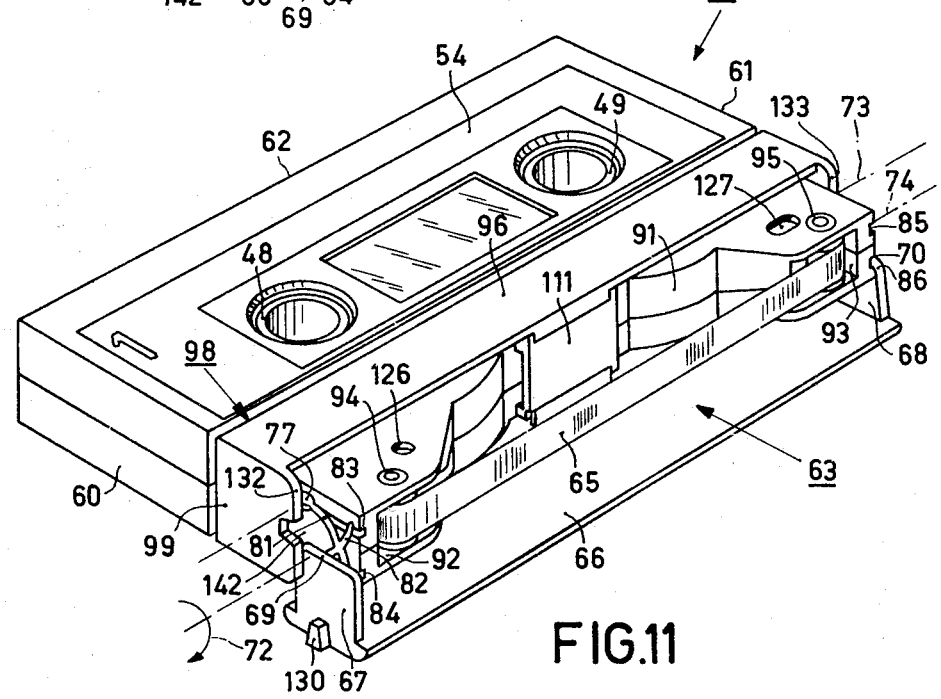
FIG. 11 is similar to FIG. 10, but with the cassette cover opened in a second pivoting direction.
Figure 12:
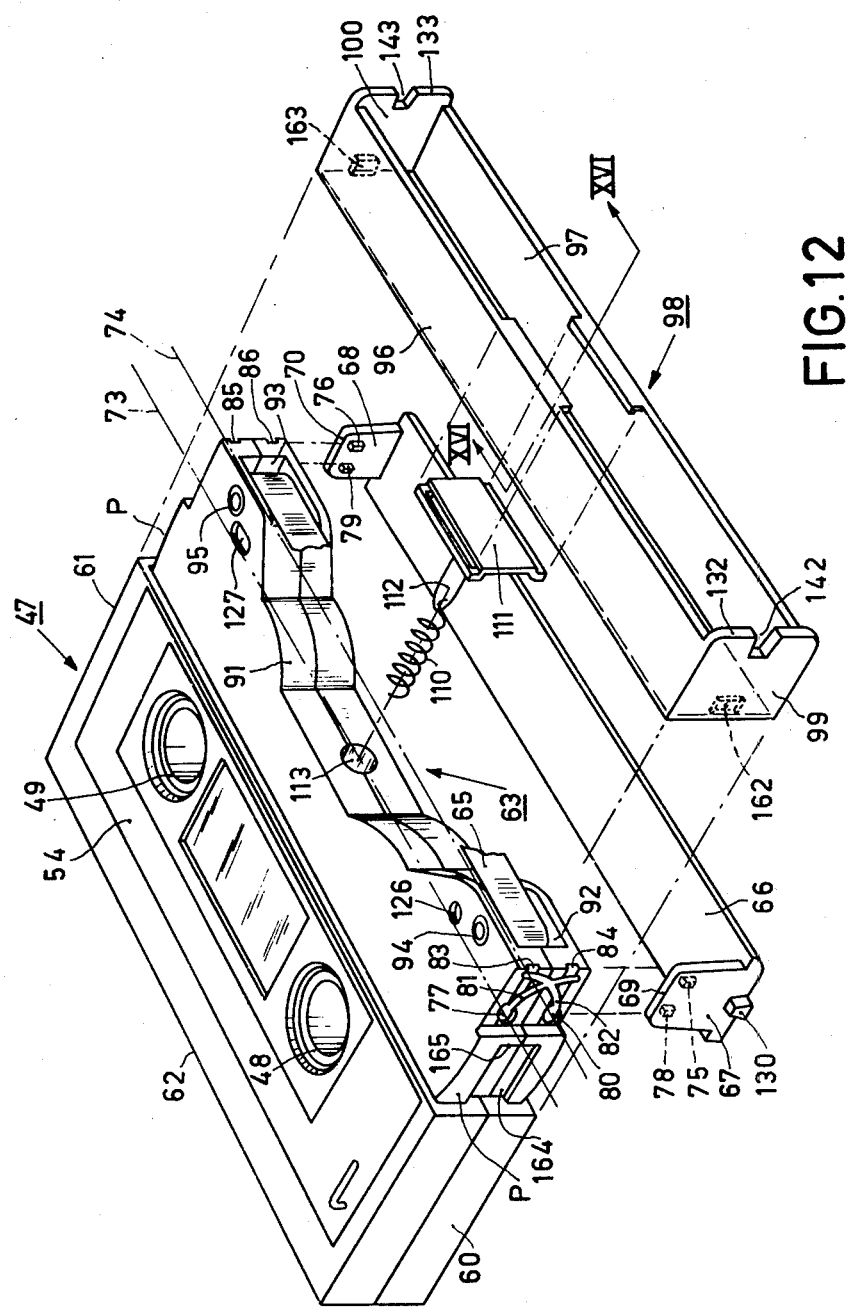
FIG. 12 is a partial exploded view of a magnetic tape cassette in accordance with FIGS. 6 to 11.

In the magnetic tape cassette 47 the pivotal bearing means comprise first pivotal bearing means situated nearer the 66 in its first direction 71 about a first pivoting axis 73 which is situated nearer the side of the first main wall 54; and second pivotal bearing means situated nearer the side of the second main wall 55, for pivoting the cassette cover in the second pivoting direction 72 about a second pivoting axis 74 spaced from the first axis and situated nearer the side of the second major wall. The first pivotal bearing means comprise first bearing journals 75 and 76 formed on the arms 67 and 68 respectively as well as parts of the cassette housing side walls 60 and 61 which define first bearing recesses 77 which receive the first bearing journals. For clarity, only the first bearing for cooperation with the bearing journal 75 is shown, in FIGS. 11 and 12. The second pivotal bearing means comprise second bearing journals 78 and 79 also formed on the arms 67 and 68 respectively, and parts of the cassette housing side walls 60 and 61 which define second bearing recesses 80 for receiving these bearing journals. Similarly, only the second bearing recess for receiving the bearing journal 78 is shown in FIGS. 10 and 12.

Each of the bearing recesses has an opening at its circumference, for moving the bearing journals 75 and 76 out of the corresponding bearing recesses when the cassette cover is pivoted about the second pivoting axis 74 and for moving the bearing journals 78 and 79 out of the corresponding bearing recesses when the cassette cover 66 is pivoted about the first pivoting axis 73.

Actuate first guide slots 81 (only one shown in FIGS. 11 and 12) each terminate in the respective opening in the circumference of the first bearing recesses 77 for guiding the first bearing journals 75 and 76 with play when the cassette cover 66 is pivoted in its second pivoting direction 72. Arcuate second guide slots 82 (again, only one shown) each terminate in the respective opening in the circumference of the second bearing recesses 80 for guiding the second bearing journal 78 with play when the cassette cover 66 is pivoted in its first pivoting direction 71.

Figure 13:
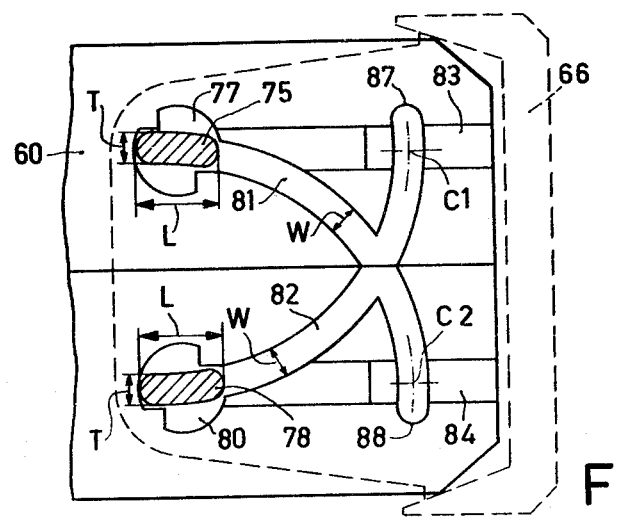
FIG. 13 shows a detail of one of the side walls of the cassette in accordance with FIGS. 6 to 12, the position of the bearing journals being shown relative to the bearing recesses and the guide slots when the cassette cover is closed.
Figure 14:
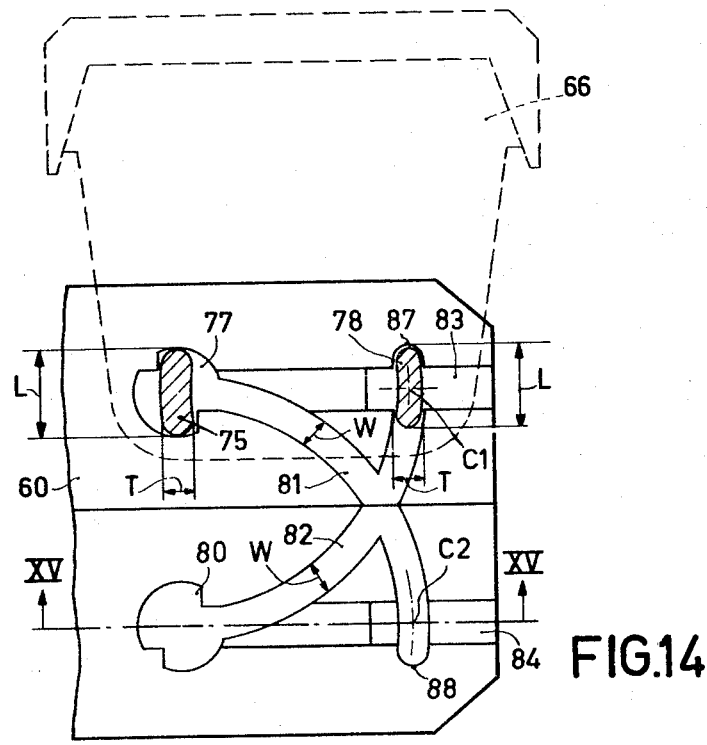
FIG. 14, shows the same detail as FIG. 13, but with the cassette cover opened in a first pivoting direction.
Figure 15:
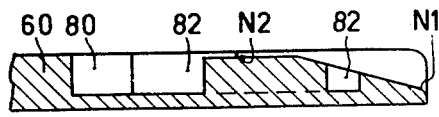
FIG. 15 is a sectional view in accordance with the arrows XV—XV in FIG. 14.
Figure 16:
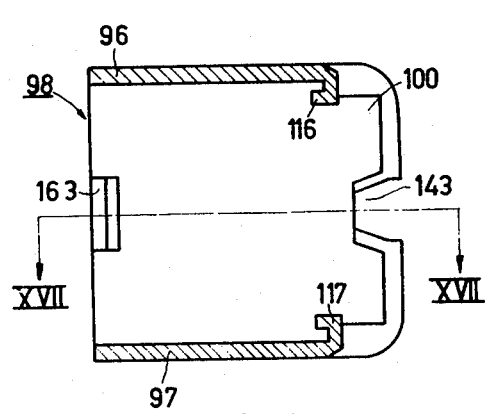
FIG. 16 is a cross-section across the center of the slide member and in accordance with the arrows XVI—XVI in FIG. 12.
Figure 17:
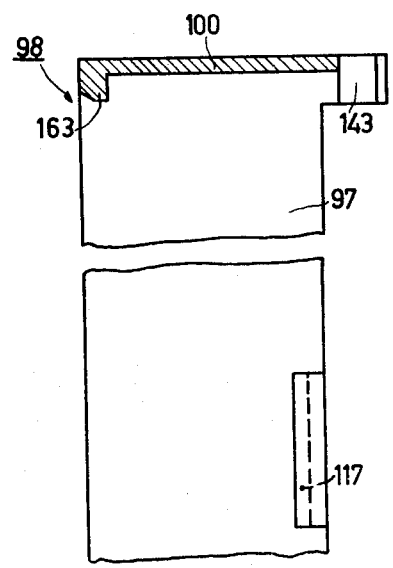
FIG. 17 is a partial cross-section in accordance with the arrows XVII—XVII in FIG. 16, FIGS. 18, 19 and 20 are views of a connecting member for interconnecting the slide plates of the slide member in the magnetic tape cassette in accordance with FIGS. 6 to 12.
Figure 18:
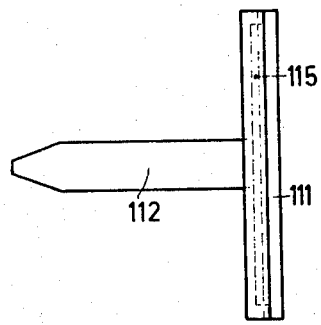
Figure 19:
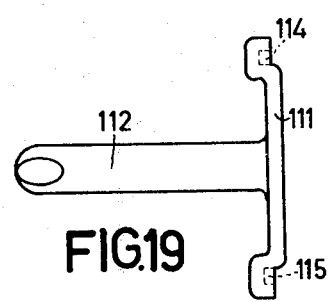
Figure 20:
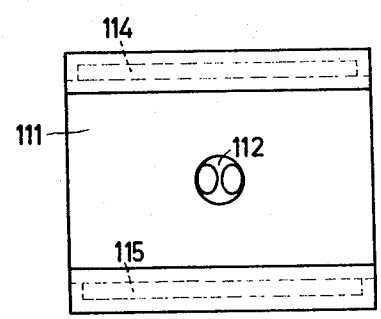

As is in particular apparent from FIGS. 13 to 15 the bearing recesses 77 and 80 have, as shown, an at least partly circular cross-section with a diameter equal to the length (maximum transverse dimension) L of the associated bearing journals 75 or 78 plus some play. The bearing journals have an elongated shape with a width dimension T which is smaller than the length dimension L. The arcuate guide slots have a width dimension W which is adapted to the width dimension T of the associated bearing journal and which is smaller than the diameter of the associated bearing recess. In this way movements of the cassette cover 66 other than in the first or the second pivoting directions 71 and 72 are prevented in any position of the cassette cover by cooperation of the bearing journals and the parts of the side walls 60 and 61 which surround the bearing recesses. The bearing journals are also arcuate, so that they always engage with the associated guide slots in a comparatively accurate manner.

The side walls 60 and 61 also have mounting slots 83 to 86 for mounting the bearing journals in the bearing recesses. FIGS. 13 and 14 show that the mounting slots 83 and 84 respectively intersect the guide slots 82 and 81 at the location of the intersections C1 and C2 respectively. The mounting slots each have an open entry side for the free entry of the bearing journal into the mounting slots. The bottom of each mounting slot has a profile which extends between a level N1 at which there is play between the cassette cover 66 and the cassette housing, and a level N2 at which the cassette cover is slightly bent by forces between the bearing journals and the bottoms of the mounting slots. As is apparent in particular from the detailed section view (FIG. 15) of the slots shown in FIG. 14 the cassette cover in its first open position is prevented from moving in a direction other than the pivoting direction by cooperation of the first bearing journals (such as the bearing journal 75) with the walls of the associated first bearing recesses 77. At the same time the second bearing journals, such as the bearing journal 78, engage the side walls of the second guide slots 82 in the pivoted position of the cassette cover. The levels N1 and N2 of the mounting slots have been selected in such a way that, if a bearing journal is situated at the location of an intersection C1 and C2, it is guided by the side walls of the relevant guide slot.

In order to limit the pivotal movements of the cassette cover 66 the side walls 60 and 61 of the cassette housing are provided with stops which cooperate with the bearing journals. It can be seen from FIGS. 13 and 14 that the guide slots 82 and 81 are closed at the ends 87 and 88 which are remote from their respective bearing recesses 80 and 77. At these locations ungrooved portions of the side walls 60 and 61 of the cassette housing constitute stops for the bearing journals.

Both main walls 54 and 55 of the magnetic tape cassette 47 have cut-outs 89 and 90 which extend to (open towards) the front opening of the cassette housing for the pasage of elements of a cassette apparatus behind the stretched tape portion 65. In order to minimize the penetration of dust into the magnetic tape cassette, even when the cassette cover is open, the cassette is provided with a closed front wall 91 at the rear of the cut-outs 89 and 90. The wall 91 has two openings 92 and 93, at a location of two tape guide rollers 94 and 95 respectively, just large enough to permit withdrawing the magnetic tape 64.

Slide Plates

Near the first and near the second main wall there are respectively located a first slide plate 96 and a second slide plate 97, which are slidable between a retracted position (FIGS. 10, 11) nearer the rear 62 of the cassette housing and a closing position (FIGS. 6-9) nearer the front 63 of the cassette housing. In the retracted position the slide plates 96 and 97 leave the cut-outs 89 and 90 in the corresponding main walls 54 and 55 free. In the closed position the cut-outs are completely closed.

The two slide plates 96 and 97 form part of a single slide member 98 (hereinafter referred to as slide 98) which is bodily movable between a retracted position (see FIGS. 10 and 11) and a closing position (see FIGS. 6 to 9). The slide 98 includes the two slide plates 96 and 97 as well as two side walls 99 and 100 which extend along the side walls 60 and 61 of the cassette housing and which interconnect the slide plates.

Figure 22:
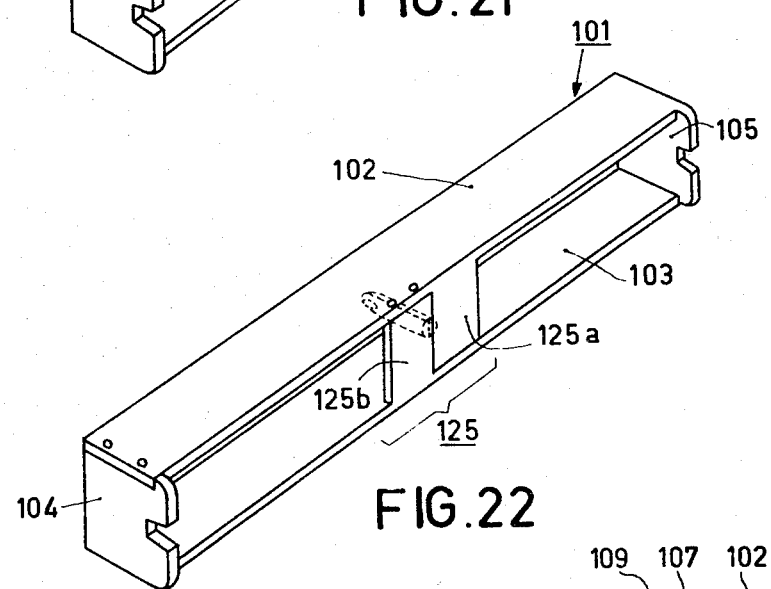
FIG. 22 shows a slide member consisting of two plastic components which have been snapped together for the magnetic tape cassette in accordance with FIGS. 6 to 12.
Figure 23:
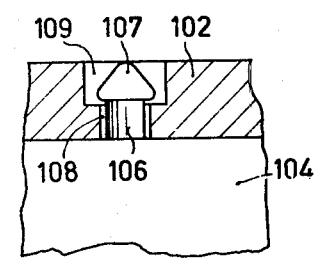
FIG. 23 shows a detail of one of the snap connections for interconnecting the parts of the slide member in accordance with FIG. 22, FIG. 24 and FIG. 25 illustrate the principle of an embodiment in which a slide member and a cassette cover are loaded relative to each other by means of a tension spring, FIG. 24 representing the situation with the cassette cover closed and FIG. 25 the situation with the cassette cover open.

In this preferred embodiment, the slide 98 is manufactured from a plastic as a unitary molding. It is alternatively possible to use a two-part slide 101 as shown in FIG. 22, which comprises slide plates 102 and 103 and side walls 104 and 105. This slide comprises two identical unitary molded plastic parts, the one part comprising the slide plate 102 and the side wall 104 and the other part the slide plate 103 and the side wall 105. The parts are connected to each other by means of snap connections. FIG. 23 shows a cross-section across the snap-connection means, which connect the slide plate 102 to the side wall 104. The connection means comprise a pin 106 with a thickened frustoconical upper end 107. At the location of the pin 106 the slide plate 102 has a hole 108, and counterbore 109 which receives the conical end 107 of the pin 106. This conical end has a diameter which is slightly larger than the hole 108, so that when the slide plate 102 is mounted on the side wall 104 the conical end is slightly elastically deformed as it passes through the hole 108 until the counterbore 109 is reached. The slide 101 operates in an identical manner as the slide 98.

In the magnetic tape cassette 47 the two pivoting arms 67 and 68 of the cassette cover 66 are located outside the cassette housing. When the slide 98 is in its closing position the arms 67 and 68 are covered by the side walls 99 and 100 of the slide, so that when the magnetic tape cassette is removed from a cassette apparatus the pivoting arms and thus the bearing means are satisfactorily protected against mechanical damage. Moreover, a clean-cut appearance is thus obtained.

Spring Restraint

Figure 6:
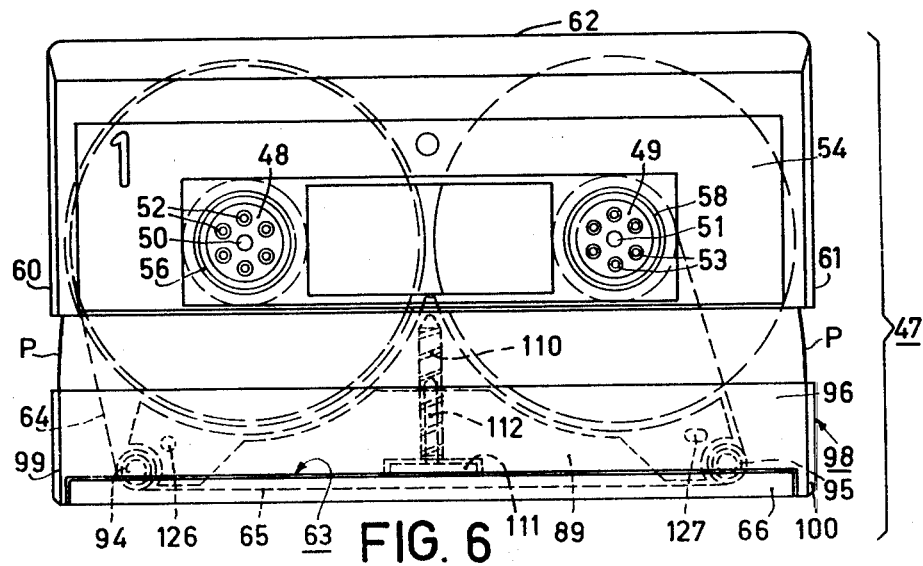
FIG. 6 is a view similar to FIG. 1, but of a magnetic tape cassette having a cassette cover pivotable about two pivoting axis and a slide member for closing the openings in the main walls.
Figure 8:
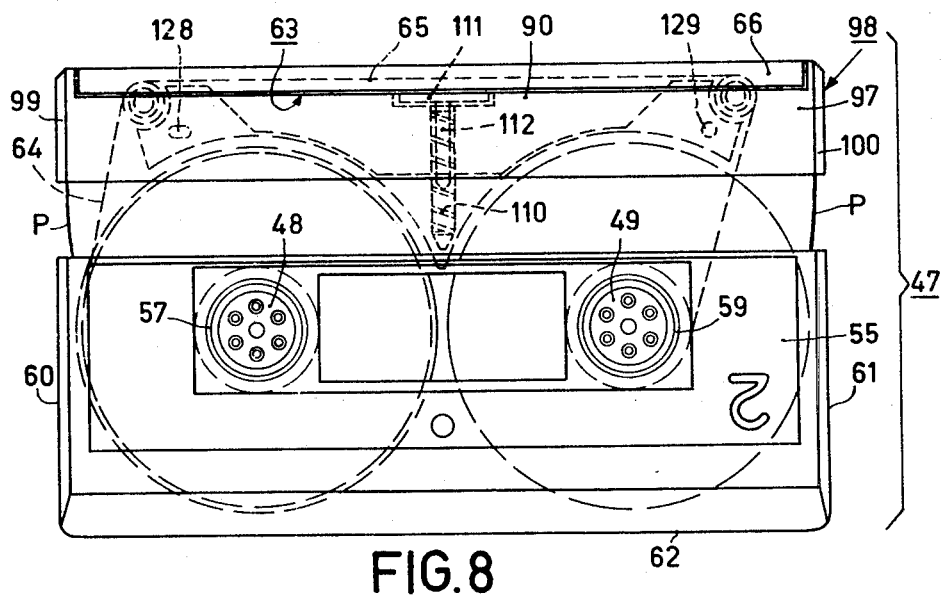
FIG. 8 is a view in accordance with FIG. 6, but now at a different main surface of the magnetic tape cassette.

The complete slide 98 is loaded towards its closing position by a pressure spring 110 (FIGS. 6 and 8). For this purpose the slide plates 96 and 97 are interconnected by a connecting plate 111 halfway between the side walls 99 and 100, behind the stretched tape portion 65. The pressure spring 110 is fitted around a pin 112 extending rearward from the plate 111, and bears against the connecting plate 111 and against the bottom of a blind hole 113 in the cassette housing midway between its side walls 60 and 61 (FIG. 12). The connecting member, also see FIGS. 18 to 20, not only serves as a point of attachment for the pressure spring 110, but also stiffens the slide 98. Without this stiffening, the comparatively thin slide plates 96 and 97 can readily be bent. The connecting plate 111 has two slots 114 and 115 which engage two ridges 116 and 117 on the rear center of the slide plates 96 and 97.

Figure 21:
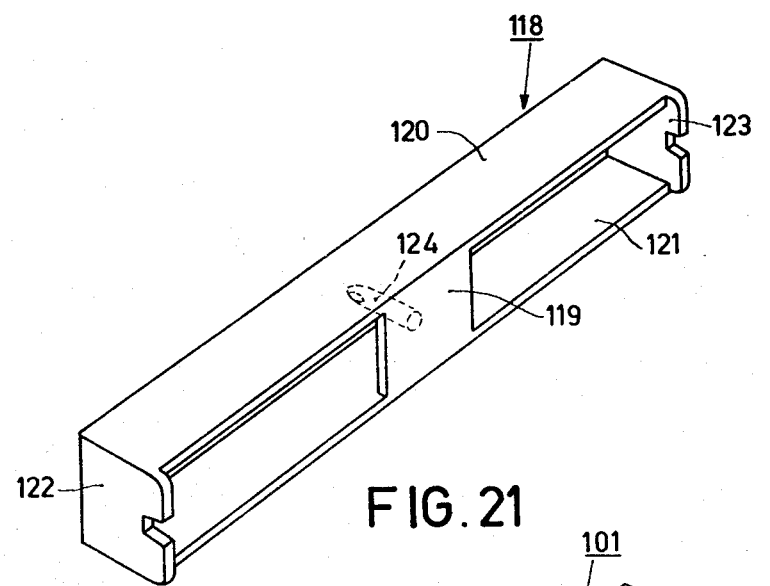
FIG. 21 shows an integrally manufactured plastic version of a slide member for a magnetic tape cassette in accordance with FIGS. 6 to 12.

Instead of a slide 98 with a separate connecting plate 111, it is alternatively possible to employ a slide 118 which is integrated with a connecting plate 119, as shown in FIG. 21. The slide plates 120 and 121, as well as the side walls 122 and 123, the connecting plate 119 and the pin 124 extending from the plate are integrally manufactured from a suitable plastic by injection molding. When such a slide is used the various components of the cassette must be assembled in such a sequence that the stretched tape portion 65 along the front of the cassette does not obstruct fitting of the slide. In order to facilitate the mounting of the pressure spring a pin may be used which is substantially shorter then the pin 124. Instead of the pin a local recess in the surface of the connecting plate may be used in order to prevent undesired lateral movements of the end of the pressure spring.

The two-part slide 101 in accordance with FIG. 22 enables the slide to be mounted after the magnetic tape has been placed in the cassette housing. This slide comprises a connecting plate 125 consisting of two parts 125A and 125B, which are integral with the slide plate 102 and the slide plate 103 respectively. The part 125B is connected to the slide plate 102 by a snap connection of the type of FIG. 23 and the part 125A is connected to the slide plate 103 by means of a similar snap connection. The pin 173 also consists of two parts, but is otherwise the same as the pin 124 described in the preceding paragraph.

Cover/Slide Movement

The pressure spring 110 ensures that the slide 98 is normally in its closing position when the cassette is not placed on a cassette apparatus, and thus covers the openings 89 and 90 in the main walls of the cassette housing. In its closing position the slide also covers any other openings in the main walls, such as the customary locating openings 126 to 129 (FIGS. 6 and 8) for locating the cassette relative to a cassette apparatus with the aid of locating pins provided on the deck of the apparatus. However, the pressure spring 110 also has another function, namely the closure of the cassette cover 66 when the slide 98 is moved to its closing position. For this purpose the slide 98 and the cassette cover 66 are provided with cooperating parts which cause the cassette cover to pivot to its closed position from either of its two open positions. As shown in FIGS. 10 and 11, the edges of the pivoting arms 67 and 68 and parts of the slide plates 96 and 97 engage in a sliding fashion to provide this cooperation.

The slide 98 and the cassette cover 66 are provided with a cooperating latch for preventing the cassette cover 66 from moving to an open position if the slide 98 is in its closing position, so that a magnetic tape cassette which has been removed from an apparatus cannot readily be opened. This is possible only after at least partly moving back the slide 98 toward its retracted position against the force of the pressure spring 110. The latching means again are formed by the edges of the pivoting arms 67 and 68 of the cassette cover 66 and parts of the slide plates 96 and 97 of the slide 98, namely those parts of the slide plates which, when the slide is in its closing position, cover the pivoting arms 67 and 68 together with the side walls 99 and 100. The latching means also include two projections 130 and 131 on either side of the cassette cover 66, which engage corresponding notches in the walls 99 and 100 of the slide 98.

Figure 7:
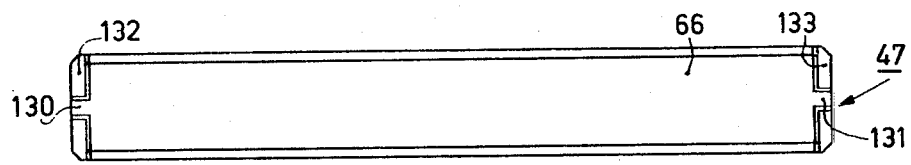
FIG. 7 is a front view of the magnetic tape cassette of FIG. 6.
Figure 9:
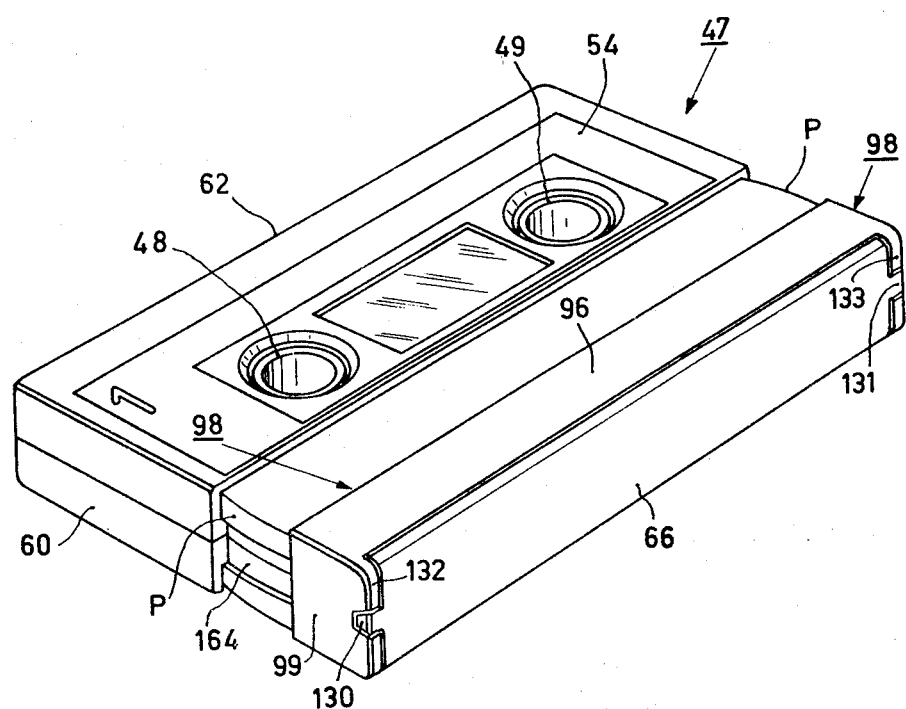
FIG. 9 is a perspective view of the cassette in accordance with FIGS. 6 to 8, the slide member being in its closing position and the cassette cover being in its closed position.
Figure 29:
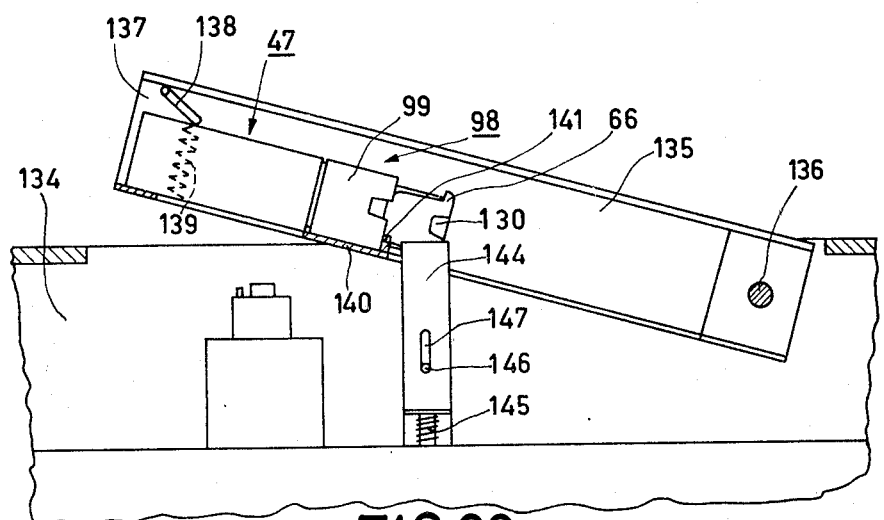
Figure 30:
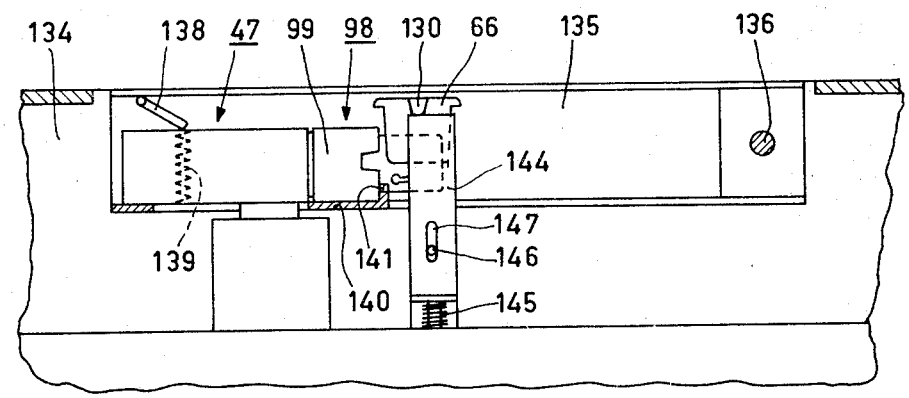
FIG. 30 is similar to FIG. 29, but with the cassette holder in its operating position and the cassette cover being opened by means provided on the deck of the cassette apparatus.

As is clearly shown especially in FIG. 7 and also in FIG. 9 the cassette cover 66 leaves the front edges 132 and 133 of the side walls 99 and 100 of the slide 98, which are remote from the rear 62 of the cassette housing, free at locations which are disposed nearer the main walls 54 and 55 of the cassette housing. This has been done to provide an abutment for moving the slide 98 to its retracted position when the magnetic tape cassette is placed in a cassette holder of a cassette apparatus, as shown in FIGS. 29 and 30. These figures show a part of a cassette apparatus 134 in cross-section at the location of a cassette holder 135. The cassette holder is pivotable about a hinge pin 136 and is thus movable from a cassette insertion position shown in FIG. 29 to an operating position shown in FIG. 30. At its front the cassette holder 135 has a cassette insertion opening. By means of tension springs 139 levers 138 urge a cassette against a partly open bottom plate 140, which is provided with upward projections 141 at each side. During insertion of a cassette these projections engage the front edges 132 and 133 of the slide 98. When the cassette 47 is inserted into the cassette holder 135 the slide 98 is thus readily moved from its closing position to its more retracted position.

The side walls 99 and 100 of the slide 98 have notches 142 and 143 which can receive the lateral projections 130 and 131 of the cassette cover in the closed position. As described above, these projections and notches latch the cassette cover in its closed position. However, the projections also enable simple opening of the cassette cover after the cassette has been inserted into a cassette holder of a cassette apparatus. For this purpose a cassette apparatus 134 may include a cover opener 144 which is mounted to the deck of a cassette apparatus 134 by a pin 146 slidable in a slotted hole 147 against upward force of a spring 145. In FIG. 29 the slide 98 already occupies its more retracted position, so that the cassette cover 66 can be pivoted. The cassette cover is pivoted when the cassette holder 135 is moved downwards, during which movement the top of the cover opener 144 engages the projection 130 on the cassette cover 66. The opposite projection 131 can similarly be engaged by a symmetrically located cover opener.

Figure 26:
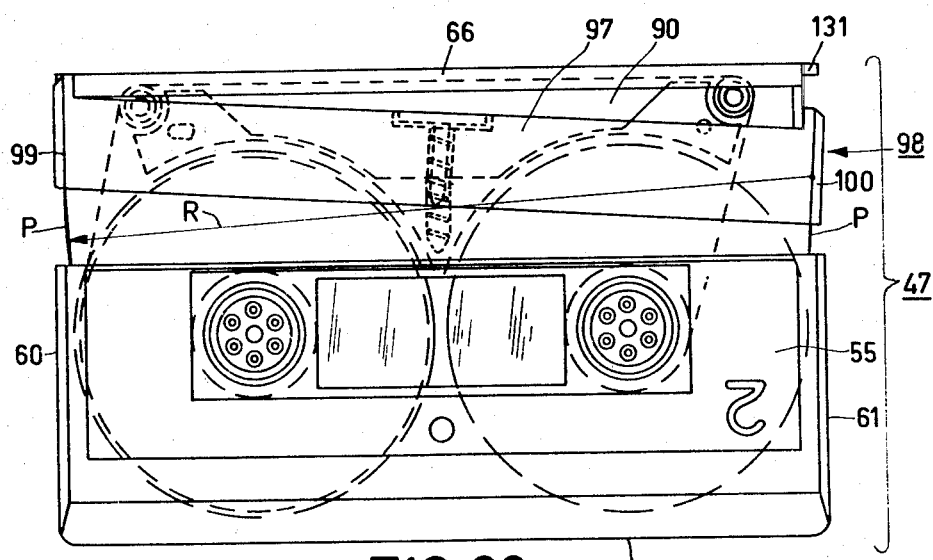
FIG. 26 is similar to FIG. 8, but with the slide member in a twisted position.

FIG. 26 is similar to FIG. 8 except that the side wall 100 of the slide 98 is now moved towards the more retracted position, while the side wall 99 is still in a position corresponding to the closing position of the slide. In such a situation the slide 98 can readily become jammed on the cassette housing. In order to prevent such an undesired situation the side walls 60 and 61, at the location of the side walls 99 and 100 of the slide 98 when they are in their more retracted positions, have been given a curved profile P with a radius of curvature R which is substantially equal to the distance between the two side walls 60 and 61 of the cassette housing. Thus, at least a limited twisting of the position of the slide 98 relative to the cassette housing is possible without the slide becoming jammed on the cassette housing. For the sake of simplicity FIG. 26 only shows a single radius R, i.e. of the profile P of the side wall 60.

Figure 27:
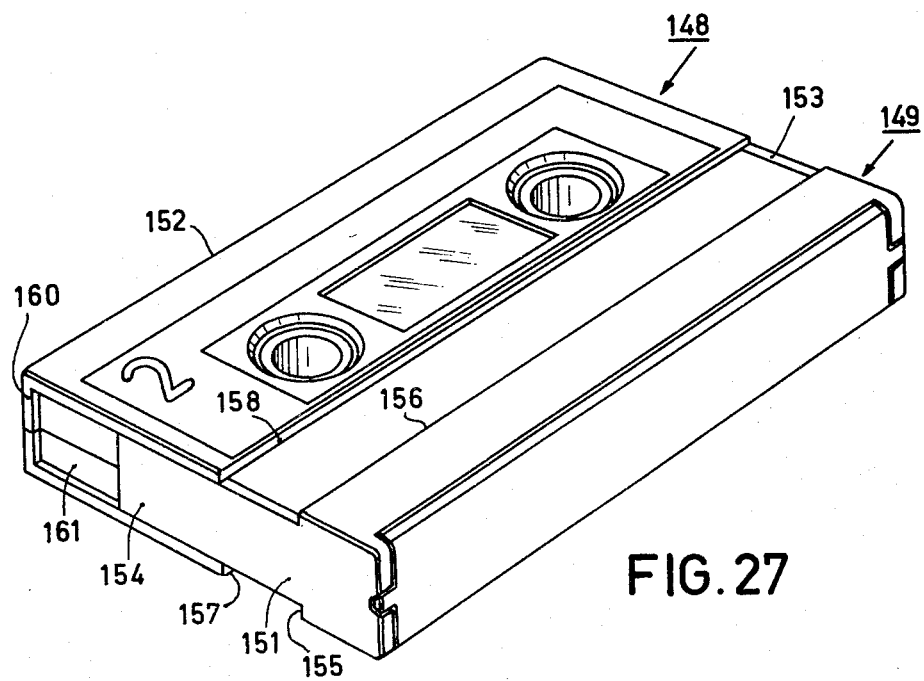
FIG. 27 is a similar view as in FIG. 9 of a modified embodiment, with a slide member which has portions protruding towards the rear of the cassette housing.
Figure 28:
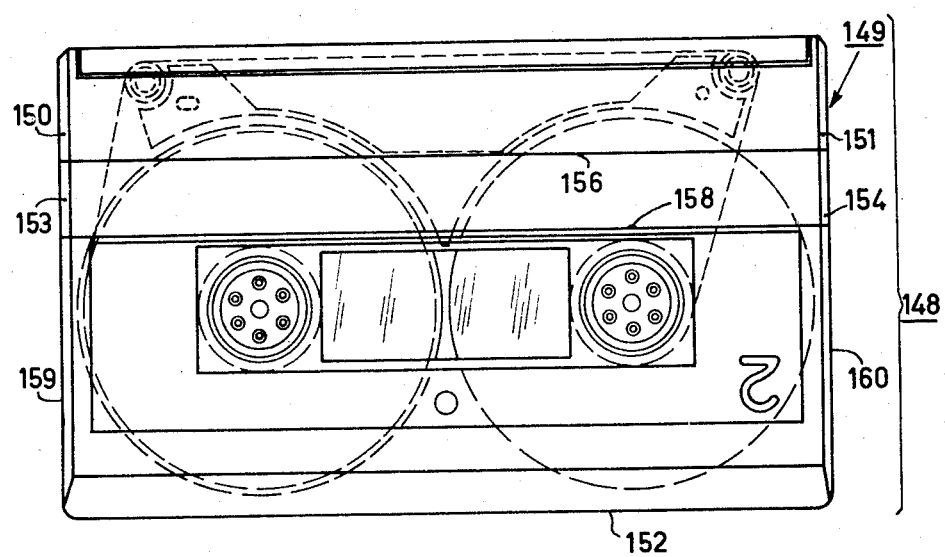
FIG. 28 is a view at a main wall of the magnetic tape cassette in accordance with FIG. 27, FIG. 29 schematically shows a part of a cassette apparatus with a hinged cassette holder containing a cassette in accordance with the invention, the slide member being moved into its more retracted position during insertion of the cassette.

Another embodiment which prevents jamming of the slide is shown in FIGS. 27 and 28. These figures show a magnetic tape cassette 148 which is substantially identical to the magnetic tape cassette shown in FIGS. 6 to 12, except for a slightly different shape of the slide member and the side walls of the cassette housing. For simplicity, only the differences of the cassette 148 will be described in full detail. It comprises a bodily movable slide member 149 with side walls 150, 151 having prolonged portions 153 and 154 respectively, which extend toward the rear 152 of the cassette housing. In the closing position of the slide each side wall of the slide 149 extends rearward beyond the location of the rear edges 155 and 156 of the slide plates when the slide 149 is in its more retracted position. This location is near two ridges 157 and 158 on the cassette housing. The side walls 159 and 160 of the magnetic tape cassette 148 have corresponding grooves 161 for guiding the prolonged portions of the side walls of the slide 149. The prolonged portions 153 and 154 not only prevent the slide 149 from becoming jammed, but, as is shown in FIG. 28, a smoother appearance of the cassette is obtained, which is aesthetically desirable.

In the cassette 47 the slide 98 and the cassette housing are provided with cooperating stop means to prevent a slide, once mounted, from sliding off the cassette housing, when the cassette cover 66 has not yet been mounted or has been removed. The slide has two inwardly facing bosses 162 and 163 (see FIGS. 12, 16 and 17), and the side walls 60 and 61 of the housing have grooves 164 in which the bosses may move (only one groove shown, in FIGS. 9 and 12). As shown in FIG. 12, the end 165 of the groove 164 serves as a stop for the boss 162. The side wall 61 has a similar groove and end stop for the boss 163. These ends are located so that the bosses abut the respective ends in the closing position of the slide 98. As a result, in the closing position the pressure of the spring 110 is transmitted to the side walls 60 and 61 of the cassette housing by the bosses 162 and 163. The cassette cover 66 and, in particular, the bearing journals 75 to 79 are not loaded by the pressure spring 110 in the closing position of the slide 98, because there is always some clearance between the cassette cover 66 and the slide 98 in its closing position.

Alternative Spring Restraint

Figure 24:
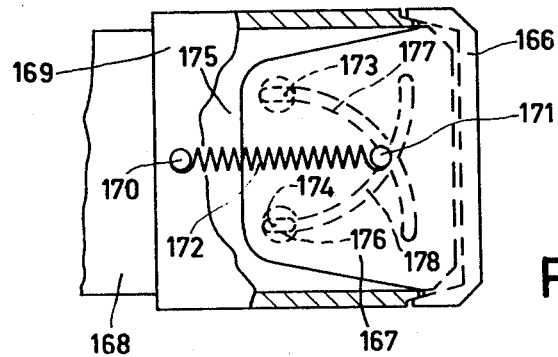
Figure 25:
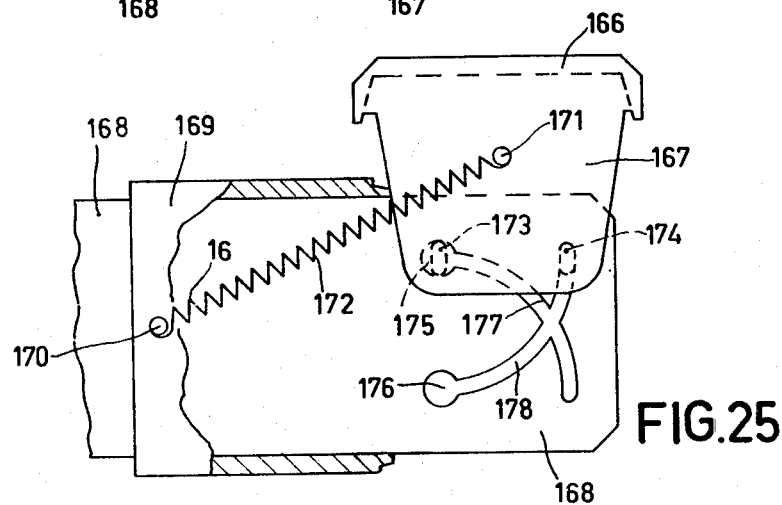

FIGS. 24 and 25 schematically show a part of a magnetic tape cassette which is largely identical to the magnetic tape cassette in accordance with FIGS. 6 to 12, but which includes resilient means for loading the cassette cover and the slide member relative to each other. A cassette cover 166 is shown, having a pivoting arm 167 which is journalled on a side wall 168 of the magnetic tape cassette. Furthermore, the cassette includes a slide 169, on which a pin 170 is located. The side wall 167 of cassette cover 136 carries a pin 171. Between the two pins a tension spring 172 is mounted. The bearing arrangement of the pivoting arm 167 includes two bearing journals 173 and 174, bearing recesses 175 and 176, as well as guide slots 177 and 178.

In the situation shown in FIG. 24 the cassette cover 166 is in the closed position and the slide 169 is in the closing position. The slide 169 is pulled towards the cassette cover 166 by the tension spring 172, the assembly being in a stable balanced position. Similarly, in the situation of FIG. 25, in which the cassette cover 166 is in one of its open positions and the slide 169 has been moved into its more retracted position, the cassette cover 166 is in a stable position under the influence of the force exerted on it. The connecting line between the pins 177 and 171 extends on such a side of the bearing journal 173 that the cassette cover tends to swing open further. However, this is prevented by abutment of the bearing journal 174 with the end of its guide slot 178. By suitably dimensioning the spring 172, allowance being made for the weight of the cassette cover 166, the cassette cover is in a stable balanced position for any orientation of the cassette relative to the force of gravity.

What is claimed is:

1. A magnetic tape cassette comprising
   a housing, having first and second plane parallel main walls, two side walls connected to the main walls, a rear, and a front having an opening between said main walls,
   two adjacent reel hubs rotatably arranged between said main walls;
   a length of magnetic tape having respective ends connected to the reel hubs, a portion of said length being stretched along said front opening for cooperation with parts of a magnetic tape apparatus, and
   cover means, connected to and pivotable relative to the housing about an axis parallel to said main walls and the cassette front, between a closed position and an open position,
   wherein said cover means comprises a single cassette cover arranged to substantially cover the entire front of the housing when in the closed position, and connecting means for pivotally connecting said cover to the housing for movement from the closed position to a first open position by pivoting in a first direction toward the first main wall, and to a second, different open position by pivoting in a second direction toward the second main wall.

2. A cassette as claimed in claim 1, wherein
   said cover comprises two pivoting arms having free ends, said arms extending along respective side walls of the cassette housing toward the housing rear when in the closed position, and
   said connecting means includes pivotal bearing means disposed midway between said main walls near said free ends, for connecting the cover to said side walls such that the cover is pivotable about a single axis in both directions.

3. A cassette as claimed in claim 1, further comprising resilient means for loading said cassette cover relative to other parts of the cassette, for holding the cover in a stable balanced position in its first and in its second open position for any orientation of the cassette relative to the direction of the force of gravity.

4. A cassette as claimed in claim 1, wherein
   said cover comprises two pivoting arms having free ends, said arms extending along respective side walls of the cassette housing toward the housing rear when in the closed position,
   said connecting means includes pivotal bearing means disposed midway between said main walls near said free ends, for connecting the cover to said side walls, and
   the pivotal bearing means comprises first pivotal bearing means for pivoting the cover in the first direction about a first pivotal axis, and second pivotal bearing means for pivoting the cover in the second direction about a second pivot axis, spaced from the first axis, the first pivotal bearing means and axis being disposed nearer the first main wall, and the second pivotal bearing means and axis being disposed nearer the second main wall.

5. A cassette as claimed in claim 4, wherein
   said first pivotal bearing means includes respective first bearing journals disposed on the respective pivoting arms of the cassette cover, the second pivotable bearing means includes second bearing journals disposed on the respective pivoting arms, and the cassette housing includes stops for engaging the second bearing journals to limit the pivotable movement of the cover in its first pivoting direction, and stops to engage the first bearing journals to limit the pivotable movement of the cover in its second pivoting direction.

6. A cassette as claimed in claim 4, wherein
the first pivotable bearing means comprise first bearing journals and parts of the cassette which define first bearing recesses for receiving the first bearing journals, and
the second pivotable bearing means comprises second bearing journals and parts of the cassette which define second bearing recesses for receiving the second bearing journals,
each of said bearing recesses having an opening at its circumference to allow movement of the first bearing journals out of the first bearing recesses when the cover is pivoted about the second pivoting axis, and to allow movement of the second bearing journals out of the second bearing recesses when the cover is pivoted about the first pivoting axis.

7. A cassette as claimed in claim 4, wherein
the bearing journals are disposed on the pivoting arms of the cover,
the housing side walls include arcuate first guide slots, which each terminate in the respective openings in the circumference of the first bearing recesses, for guiding the first bearing journals with play when the cassette cover is pivoted in its second pivoting direction; and second guide slots, which each terminate in the respective openings in the circumference of the second bearing recesses, for guiding the second bearing journals with play when the cassette cover is pivoted in its first pivoting direction,
each of said guide slots having an end remote from the associated bearing recess terminating at a portion of the housing side wall, said side wall portion being one of said stops for limiting pivotable movement of the cover.

8. A cassette as claimed in claim 6, wherein
parts of the cassette define arcuate first guide slots, which each terminate in the respective openings in the circumference of the first bearing recesses, for guiding the first bearing journals with play when the cassette cover is pivoted in its second pivoting direction, and
parts of the cassette define arcuate second guide slots, which each terminate in the respective openings in the circumference of the second bearing recesses, for guiding the second bearing journals with play when the cassette cover is pivoted in its first pivoting direction.

9. A cassette as claimed in claim 8, wherein
the bearing recesses have an at least partly circular cross-section with a diameter equal to the maximum transverse dimension of the associated bearing journal plus the play,
the bearing journals have an elongate shape, with a width dimension which is smaller than the length dimension, and
the arcuate guide slots have a width dimension which is adapted to the width dimension of the associated bearing journal and is smaller than the diameter of the associated bearing recess so as to prevent movements of the cassette cover other than in the first or the second pivoting direction in every position of the cassette cover.

10. A cassette as claimed in claim 9, wherein
said bearing journals are disposed on the pivoting arms of the cover, and the guide slots are located in the housing side walls, and
each side wall of the housing further includes mounting slots extending in the direction of the bearing recesses and intersecting the guide slots at intersections, for mounting the bearing journals in the bearing recesses, said mounting slots each having an open entry side to allow unimpeded entry of the bearing journal into the mounting slot and having a bottom with a profile which extends between a first level at which there is play between the cassette cover and the cassette housing, and a second level at which the cassette cover has an interference fit between the respective bearing journals and the bottoms of the mounting slots.

11. A cassette as claimed in claim 1, each main wall having at least one cut-out which extends to the cassette front, to permit passage of an element of a cassette apparatus behind the stretched portion of the tape and withdrawal of the tape from the housing at the front,
wherein the cassette further comprises first and second slide plates disposed respectively near the first and second main walls, and means for mounting said slide plates to the housing for movement between a closing position nearer the front of the cassette and a retracted position nearer the rear of the cassette, in the closing position each slide plate at least partly closing the respective cut-out openings in the respective main wall, in the retracted position the slide plate being clear of said respective cut-out openings.

12. A cassette as claimed in claim 11, wherein
said two slide plates are parts of a single slide member which is bodily movable between a retracted position and a closing position, said member further including two side walls which extend along the side walls of the cassette housing and which interconnect the slide plates.

13. A cassette as claimed in claim 12, wherein
said slide member consists of a unitary plastic molding.

14. A cassette as claimed in claim 12, wherein
the slide member consists of two identical parts each having snap-connection means for interconnecting said identical parts through a snap connection, each of said identical parts being a unitary plastic molding.

15. A cassette as claimed in claim 12, wherein
said cover comprises two pivoting arms having free ends, said arms being disposed on the outside of the cassette housing, and extending along respective side walls of the cassette housing toward the housing rear when in the closed position, the slide member being arranged such that in the closed position of the cassette cover the slide member side walls cover the pivoting arms.

16. A cassette as claimed in claim 12, comprising resilient means for urging the cassette cover and the slide member toward each other, for holding the cassette cover in a stable balanced position under the influence of the resilient urging in its first and in its second open positions for any orientation of the magnetic tape cassette relative to the direction of the force of gravity.

17. A cassette as claimed in claim 12, wherein
each slide member side wall includes a portion prolonged to the rear of the cassette housing, so arranged that in the closing position of the slide member each side wall of the said member extends beyond the location of rear edges of the side plates when the slide member is in the more retracted position.

18. A cassette as claimed in claim 12, wherein
said slide member and said housing include cooperating stop means for preventing a slide member, mounted on the housing, from sliding off the housing in the absence of the cassette cover.

19. A cassette as claimed in claim 18, wherein
said cooperating stop means are arranged so that when the slide member is in its closing position a portion of said slide member abuts a portion of the cassette housing, and wherein said cassette includes resilient means which act both on the cassette housing and the slide member for urging the slide member toward the closing position, whereby in the closing position said stop means transmits the resilient load from the slide member to the cassette housing.

20. A cassette as claimed in claim 12, wherein
said slide member and said cassette cover include cooperating parts for causing the cassette cover to pivot toward the closed position from either one of the two open positions.

21. A cassette as claimed in claim 20, wherein
the slide member and the cassette cover include cooperating latching means for preventing the cassette cover from moving to a open position when the slide member is in the closing position.

22. A cassette as claimed in claim 21, wherein
each of the side walls of the slide member has an edge remote from the rear of the cassette housing arranged to be clear of the cassette cover, at least at locations disposed near the main walls of the housing, for engagement by an element of a cassette holder when the cassette is inserted into a cassette apparatus, so as to move the slide member to its more retracted position.

23. A cassette as claimed in claim 22, wherein
each of said edges of the slide member side walls includes a notch located midway between the main walls of the housing, and the cassette cover includes lateral projections for engaging the respective notch when the cassette cover is closed.

24. A cassette as claimed in claim 12 wherein,
at the location of the side walls of the slide member when this member is in its more retracted position, each of the side walls of the housing has a curved profile having a radius of curvature substantially equal to the distance between the two housing side walls, so arranged that the slide member may undergo at least limited twisting relative to the cassette housing whereby one side wall of the slide member becomes disposed nearer the rear of the cassette housing than the other slide member side wall, without jamming of the slide member on the housing.

25. A cassette as claimed in claim 12, comprising resilient means for urging the slide plates toward their closing positions, said resilient means acting both on the cassette housing and on the slide plates.

26. A cassette as claimed in claim 25, wherein
said two slide plates are parts of a single slide member which is bodily movable between a retracted position and a closing position, said member further including two side walls which extend along the side walls of the cassette housing and which interconnect the slide plates, said slide member further including a connecting member halfway between the member side walls, behind the stretched tape portion, and said resilient means for loading the slide member toward the closing position comprises a pressure spring bearing against the connecting member and the cassette housing.

27. A cassette as claimed in claim 26, wherein said slide member and the connecting member together consist of a unitary plastic molding.

28. A cassette as claimed in claim 26, wherein
the slide member consists of two identical parts each have snap-connection means for interconnecting said identical parts through a snap connection, each of said identical parts being a unitary plastic molding, and said connecting member is formed by identical parts of said two identical parts.

* * * * *